US008584002B2

(12) United States Patent
Cave et al.

(10) Patent No.: US 8,584,002 B2
(45) Date of Patent: Nov. 12, 2013

(54) AUTOMATIC SUB-TEMPLATE SELECTION BASED ON CONTENT

(75) Inventors: Richard Cave, Camas, WA (US); Christopher Rudolph, Camas, WA (US); Martin Murrett, Portland, OR (US); Roger Rosner, Mountain View, CA (US); Jay Capela, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 1101 days.

(21) Appl. No.: 11/329,326

(22) Filed: Jan. 9, 2006

(65) Prior Publication Data

US 2007/0162846 A1  Jul. 12, 2007

(51) Int. Cl.
G06F 3/048 (2013.01)
G06F 17/00 (2006.01)
G06F 17/30 (2006.01)

(52) U.S. Cl.
CPC .................................. *G06F 17/3089* (2013.01)
USPC ............................ 715/210; 715/255; 715/764

(58) Field of Classification Search
USPC ......... 715/324, 210, 234, 764, 744, 866, 201, 715/202, 255; 707/E17.111, E17.116
See application file for complete search history.

(56) References Cited

U.S. PATENT DOCUMENTS

| 6,910,049 | B2 * | 6/2005 | Fenton et al. | 707/104.1 |
|---|---|---|---|---|
| 6,944,817 | B1 * | 9/2005 | Danneels | 715/207 |
| 7,069,310 | B1 * | 6/2006 | Bartholomew | 709/219 |
| 7,472,175 | B2 * | 12/2008 | Bartholomew | 709/219 |
| 7,552,338 | B1 * | 6/2009 | Swildens et al. | 713/176 |
| 2002/0065976 | A1 * | 5/2002 | Kahn et al. | 711/1 |
| 2002/0152245 | A1 * | 10/2002 | McCaskey et al. | 707/530 |
| 2002/0156842 | A1 * | 10/2002 | Signes et al. | 709/203 |
| 2002/0194194 | A1 * | 12/2002 | Fenton et al. | 707/104.1 |
| 2003/0126027 | A1 * | 7/2003 | Nelson et al. | 705/26 |
| 2003/0130894 | A1 * | 7/2003 | Huettner et al. | 705/14 |
| 2003/0174160 | A1 * | 9/2003 | Deutscher et al. | 345/716 |
| 2004/0019613 | A1 * | 1/2004 | Jones et al. | 707/200 |
| 2004/0123244 | A1 * | 6/2004 | Campbell et al. | 715/517 |
| 2004/0189703 | A1 * | 9/2004 | Zhang et al. | 345/762 |
| 2004/0205609 | A1 * | 10/2004 | Milton et al. | 715/522 |
| 2004/0225652 | A1 * | 11/2004 | Duncan et al. | 707/4 |
| 2005/0102324 | A1 * | 5/2005 | Spring et al. | 707/104.1 |
| 2005/0114784 | A1 * | 5/2005 | Spring et al. | 715/762 |
| 2005/0210414 | A1 * | 9/2005 | Angiulo et al. | 715/838 |
| 2005/0223320 | A1 * | 10/2005 | Brintzenhofe et al. | 715/517 |
| 2005/0246752 | A1 * | 11/2005 | Liwerant et al. | 725/109 |
| 2005/0273515 | A1 * | 12/2005 | Bodlaender | 709/232 |
| 2006/0053390 | A1 * | 3/2006 | Gariepy-Viles | 715/789 |
| 2006/0150088 | A1 * | 7/2006 | Kraft et al. | 715/517 |
| 2006/0206804 | A1 * | 9/2006 | Barnett | 715/513 |
| 2006/0277248 | A1 * | 12/2006 | Baxter et al. | 709/201 |
| 2006/0282759 | A1 * | 12/2006 | Collins et al. | 715/500 |
| 2006/0288389 | A1 * | 12/2006 | Deutscher et al. | 725/88 |

(Continued)

OTHER PUBLICATIONS

Introducing Dreamweaver MX 2004, published Dec. 10, 2003 by Macromedia, pp. 3-34.*

*Primary Examiner* — Stephen Hong
*Assistant Examiner* — Ahamed I Nazar
(74) *Attorney, Agent, or Firm* — Fletcher Yoder PC

(57) ABSTRACT

Enabling a user to create or edit a webpage is disclosed. A content type of a content item to be included in the webpage is determined automatically. Code appropriate to the content type as required to include the content item in the webpage as published is generated.

21 Claims, 6 Drawing Sheets

(56) References Cited

U.S. PATENT DOCUMENTS

| | | | |
|---|---|---|---|
| 2007/0006262 A1* | 1/2007 | Cleron et al. | 725/42 |
| 2007/0079236 A1* | 4/2007 | Schrier et al. | 715/517 |
| 2007/0089053 A1* | 4/2007 | Uhlig et al. | 715/513 |
| 2007/0162857 A1* | 7/2007 | Weber et al. | 715/731 |
| 2008/0183760 A1* | 7/2008 | Spring et al. | 707/104.1 |
| 2008/0319950 A1* | 12/2008 | Lasa et al. | 707/3 |
| 2012/0110440 A1* | 5/2012 | Rosner et al. | 715/246 |

* cited by examiner

US 8,584,002 B2

AUTOMATIC SUB-TEMPLATE SELECTION BASED ON CONTENT

BACKGROUND OF THE INVENTION

Higher speed Internet connections and other advances in telecommunications technology have resulted in widespread use of the Internet, and in particular the World Wide Web, to distribute audiovisual media content, such as photographs and other still images and graphics; theatrically-released and other movies, television shows, music videos, newscasts, home movies, and other video content; and music, radio broadcasts, and other audio content. Increasingly, individuals, small business, non-profit organizations, and others that have not traditionally had significant access to mainstream media or other effective distribution channels for audiovisual content have used the Web to distribute media content. Examples include personal and small entity home pages, distribution by email, and more recently posting media content on blog or other sites. However, each type of media object (e.g., file) must be published to the Web in a manner suitable for that type of media object, e.g., by generating the correct html for an object of that type, and few individuals or small entities know how to make such objects accessible to others via a blog or other website. Therefore, there is a need for an effective and user-friendly way to enable unsophisticated users to include media objects of various types in webpages created and/or edited by such users.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatic sub-template selection based on content is disclosed. Upon receiving an indication that an item of media content is to be incorporated into a webpage or other document or file, the type of media object is determined automatically and a sub-template or other object configured to integrate a media object of that type into the webpage or other document or file, including in the case of a webpage a sub-template configured to generate html and/or other code required to integrate the media object into the webpage as published and have the media object be represented on and accessible via the webpage as published, is selected and associated with the webpage or other document or file, and the media object is linked automatically to the selected sub-template.

Figure 1:
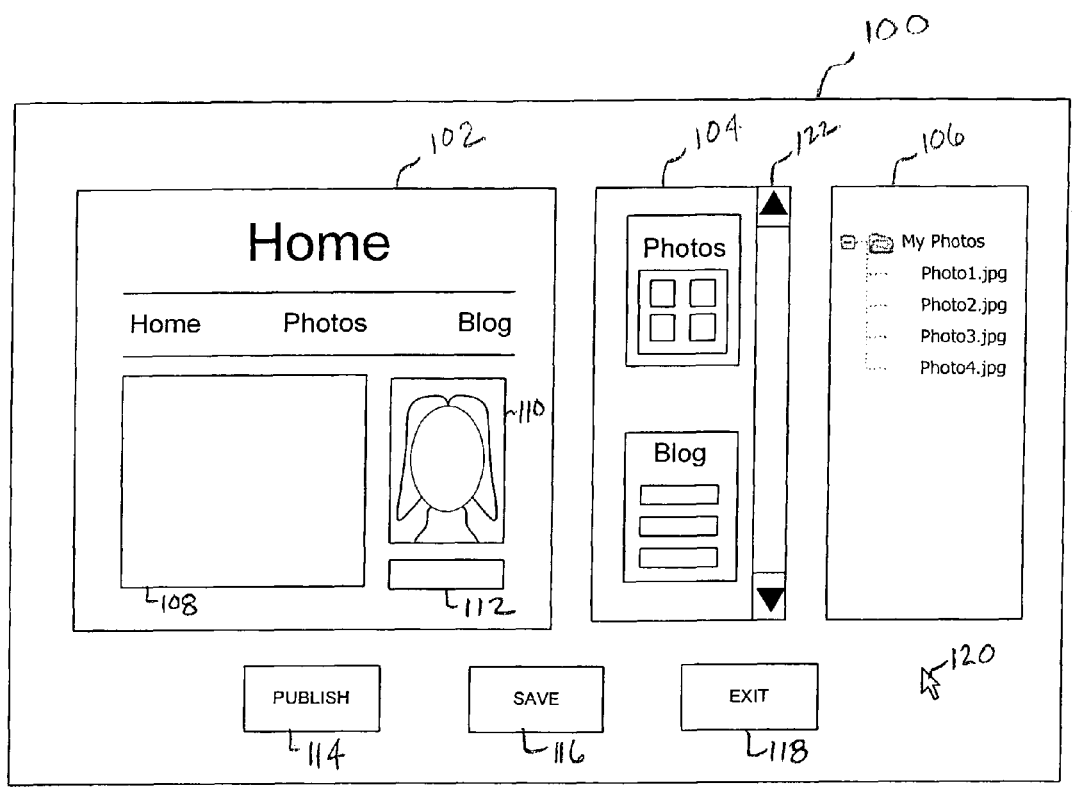
FIG. 1 is a block diagram illustrating an embodiment of a user interface for creating and/or editing a webpage.

FIG. 1 is a block diagram illustrating an embodiment of a user interface for creating and/or editing a webpage. A user interface 100 includes an editing pane 102, a template pane 104, and a user file navigation pane 106. In some embodiments, the user file navigation pane 106 is not included in user interface 100 and is instead provided by an operating system or other software installed on a client on which the user interface 100 is running. The user file navigation pane 106 enables a user to navigate to user files stored on or otherwise available via the user's client system, such as files stored on a hard drive associated with the client system, on removable or other media currently installed on a drive or port of the client system, and/or on a system and/or storage device or media accessible to the client system via a network.

The user interface 100 also includes a "save" button 116 to save the webpage/project currently being edited, a "publish" button 114 to publish the current project to the Web, and an "exit" button 118 to exit the user interface 100 and close the associated application. A pointer icon 120 responsive to manipulation by a user of a mouse or other user input/control is provided to enable a user to activate controls such buttons 114-118, position a cursor in a text or other area, and/or drag/drop items into editing pane 102, such as a template from template pane 104 or a file or other object from user file navigation pane 106. Selection of the publish button 114 causes an application or module associated with user interface 100 to generate html and/or other code and objects as required to publish the webpage(s) to the Web. In some embodiments, selection of publish button 114 causes an existing or available web access and/or publishing account, such as ".Mac" account provide by Apple Computer, Inc., to be opened and used to publish the webpage(s). In some embodiments, if no such account exists or is known a user is prompted to open an account and/or provide data identifying an account to be used to publish the webpage(s).

In the example shown in FIG. 1, a home page has been selected for creation or editing. A home page such as the one displaying in the editing pane 102 as shown in FIG. 1 is opened in various embodiments by opening a previously saved webpage/website project that includes the home page, by selecting "new" from a file or other menu to indicate a desire to start a new webpage/website project, and/or by selecting a homepage template from among one or more homepage templates displayed in template pane 104.

Template pane 104 displays a "thumbnail" size icon for each of a set of one or more templates available to be selected by a user, e.g., by clicking or double-clicking on the desired template and/or dragging and dropping the desired template into editing pane 102, to create and open for editing in editing pane 102 a new webpage. In some embodiments, the templates displayed at any given time in template pane 104 comprise or at a user's option may comprise a subset of a broader set of available templates. In some embodiments additional templates may be obtained, e.g., purchased, via the Internet or otherwise. In some embodiments, the templates displayed in template pane 104 includes a blank template and/or one or more templates that have a background associated with one or more other templates displayed in template pane 104 but no other default/placeholder content. In the example shown, template pane 104 includes a scroll bar 122 to enable a user to view additional templates.

In various embodiments, templates as displayed in template pane 104 and/or as displayed initially in editing pane 102, when selected, include one or more items of placeholder content displayed as it would appear upon being published to the Web. The placeholder content enables a user to see the layout and styling applied to content items on the page. Placeholder text is replaced in some embodiments by selecting the placeholder text in the editing pane 102 and replacing it with user content, e.g., text entered in editing pane 102 using a keyboard or other input device; text cut and pasted from a document, file, clipboard, or other source; and/or text in a file or other object dragged from user file navigation pane 106 to the placeholder as displayed in editing pane 102.

In the example shown in FIG. 1, the home page displayed in editing pane 102 includes a placeholder title "Home" with a website navigation bar underneath the title listing the pages "Home", "Photos", and "Blog". In this example, the project being edited includes three pages, each still having the placeholder title in the title area. In some embodiments, editing the title in any individual page causes the link to that page as listed in the navigation bar to be updated to reflect the user-supplied title. In some embodiments, a user can edit the automatically-generated link by clicking on the associated text in the navigation bar as displayed on any page and entering the desired text. The home page displayed in editing pane 102 as shown in FIG. 1 includes a main text area 108, an image area 110, and an image caption text area 112. In this example, a default image of a person's head is included as a placeholder image in image area 110, enabling a user to see the styling/formatting that would be applied to a user image substituted for the placeholder image. A user image dragged from user file navigation pane 106, e.g., "Photo1.jpg" in the example shown, and dropped in image area 110 in some embodiments causes the placeholder image to be replaced by the user image, with the styling and formatting formerly applied to the placeholder image being applied to the user image automatically, and the user image being displayed, in place of the placeholder image, in image area 110 in real time, automatically and substantially immediately after the user image file is dropped in image area 110, with the same appearance as the image would have as published to the Web.

Figure 2:
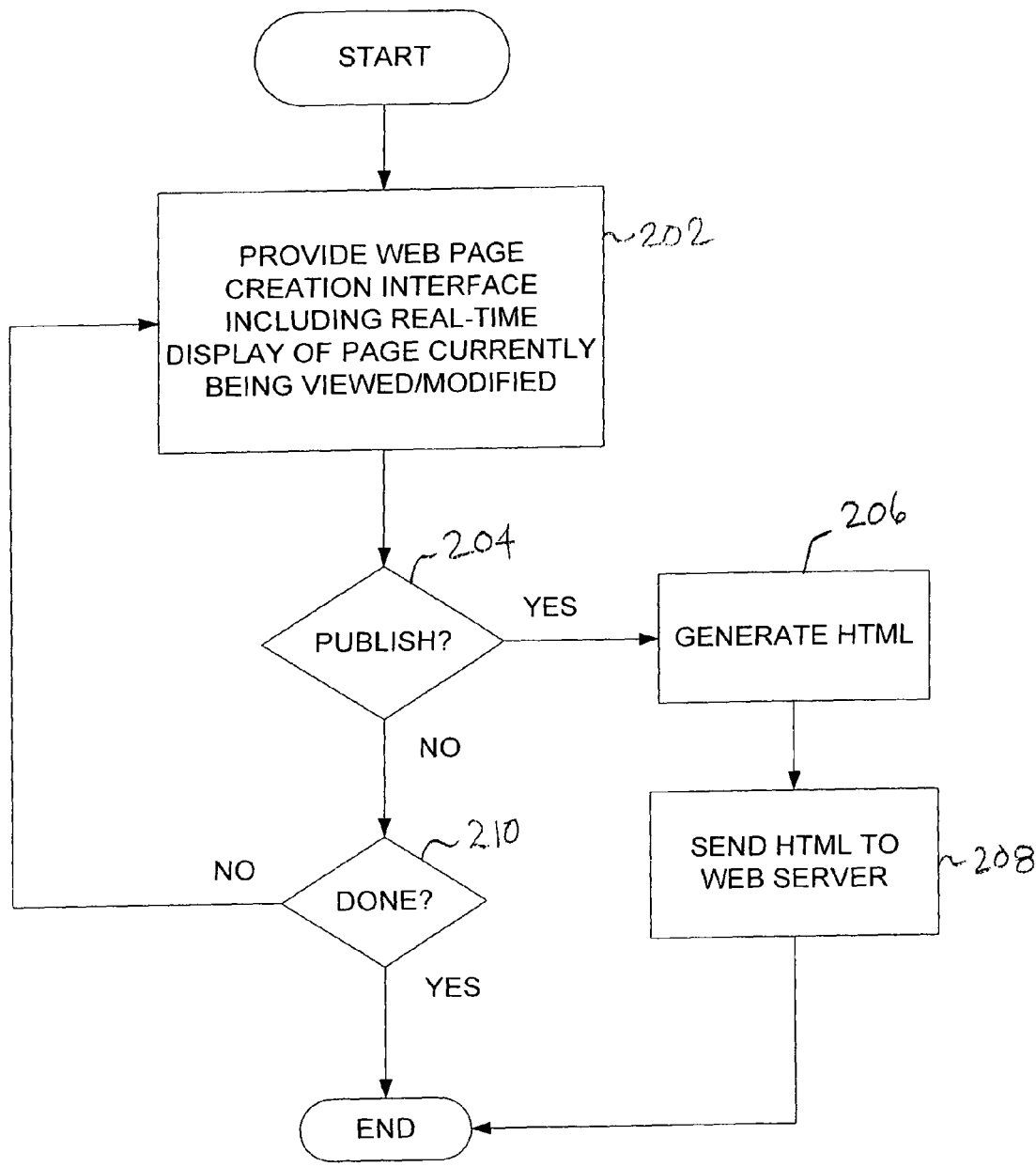
FIG. 2 is a flow chart illustrating an embodiment of a process for enabling a user to create and/or edit a webpage.

FIG. 2 is a flow chart illustrating an embodiment of a process for enabling a user to create and/or edit a webpage. In the example shown, at 202 a web page creation/editing user interface that provides in real time a display of a webpage that is currently being created, viewed, and/or edited that shows the webpage as it will/would appear when published to the Web. In some embodiments, the user interface 100 of FIG. 1 is provided. At 204, it is determined whether an indication has been received that the webpage and/or a website or project of which it is a component is desired to be published to the Web. If so, at 206 any html or other code or content required to be generated to publish the page (and any other pages comprising the site, if applicable) is generated and in 208 the html and/or other code or content is sent to a web server, after which the process of FIG. 2 ends. In some embodiments, 208 includes opening and accessing an existing, known (e.g., preconfigured), and/or newly opened web access and posting account, such as a .Mac account and providing the html and/or other code or content for publication to the Web. In some embodiments, 208 includes receiving a URL or other address or identifier usable to access the webpage and/or associated site via the Web. If at 204 it is determined that an indication that the webpage is to be published has not been received, it is determined at 210 whether the user has indicated he/she is done editing the current page or project. If so, the user interface is closed and the process of FIG. 2 ends. Otherwise, at 202 the interface remains open and the current page displayed unless/until the page is published and/or the user indicates he/she is done.

Figure 3:
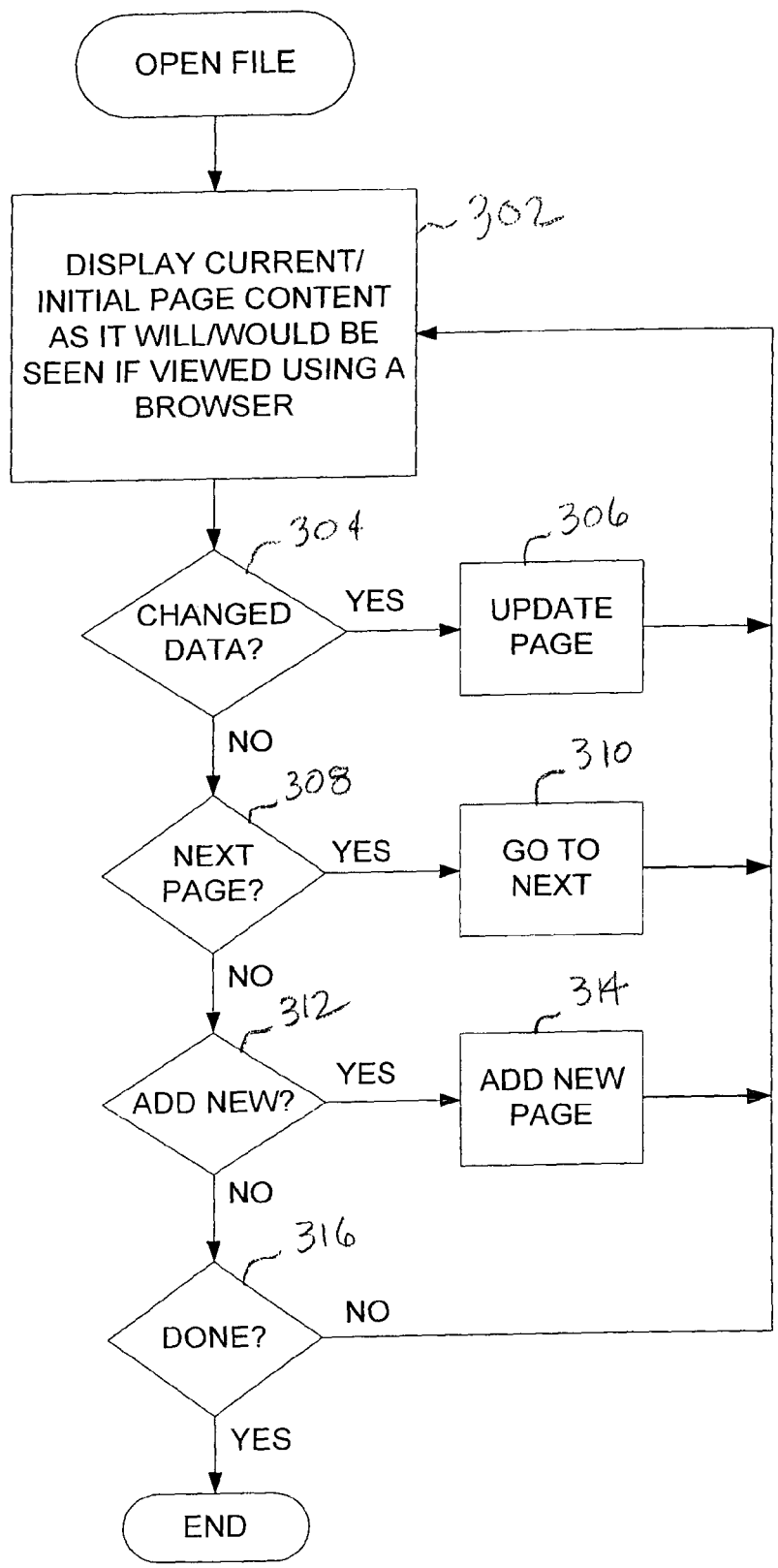
FIG. 3 is a flow chart illustrating an embodiment of a process for providing a webpage creation/editing interface.

FIG. 3 is a flow chart illustrating an embodiment of a process for providing a webpage creation/editing interface. In some embodiments, 202 of FIG. 2 includes the process of FIG. 3. At 302, a webpage that is currently being created, viewed, and/or edited is displayed, e.g., in an editing pane such as editing pane 102 of FIG. 1, with current and/or initial or default page content with the appearance the page will/would have when/if published to the Web. As content data is added and/or modified (304) the display is updated automatically and in real time to incorporate the changes (306), so that the page as displayed via the user interface always shows the current state of the page as created and/or edited by the user, always having the appearance the page will/would have if/when published. If an indication that a next existing webpage, e.g., another page comprising a website or project with which a webpage currently being displayed is associated, is desired to be displayed and/or edited (308), the next page is accessed and displayed via the user interface (310) and the current page content for that page is displayed via the user interface, and updated as content is added and/or modified, as the user views/edits the page (302-306). If an indication that a new webpage, e.g., a new page to be added to a website or project with which a webpage currently being displayed is associated and/or a new page not related to the current page, is desired to be displayed and/or edited (312), the new page is generated, e.g., based on the selected template, and displayed via the user interface (314) and the current page content for that page is displayed via the user interface, and updated as content is added and/or modified, as the user views/edits the page (302-306). The process of FIG. 3 ends when an indication is received that the user is done creating/editing pages (316).

Automatic selection of a sub-template based on content is disclosed. In some embodiments, upon receiving an indication that an item of content, e.g., a media content item such as an image (e.g., a .jpg, .tiff, or other image file), video (e.g., a .mov, .avi, or other video file), or audio (e.g., .mp3 or other audio file), is to be included in a webpage or other document, file, or body of content, the content type is determined and a sub-template appropriate for content of that type is selected and used to incorporate the content item into the webpage or other body of content. In some embodiments, the sub-template becomes associated with a main template used to provide the webpage into which the item of content is being incorporated. In the case of a webpage, the sub-template in some embodiments is configured to generate html and/or other code of the type, form, and content required to cause the content item to be displayed/represented and otherwise made accessible via the webpage as published.

For example, in the case of a webpage created and/or edited via a user interface such as interface 100 of FIG. 1, dragging a content item into a media item placeholder, such as image area 110, results in automatic detection of the content type and automatic selection, and association with a template on which the webpage is based, of a sub-template configured to cause a content type-appropriate representation of the content item to be displayed via the user interface and on the webpage as published and to generate, e.g., upon receiving an indication that the webpage is to be published, html and/or other code of the type, form, and content required to cause the content item to be displayed/represented and otherwise made accessible via the webpage as published.

In some embodiments, a sub-template selected automatically based on content type provides a content-appropriate display and interface, e.g., in an associated portion of an editing pane such as editing pane 102. For example, in the case of a user content object dragged into or otherwise associated with the image area 110 of the page displayed for editing in editing pane 102 as shown in FIG. 1, in some embodiments a different representation and interface is provided in image area 110 depending on the type of content placed there by the user.

Figure 4A:
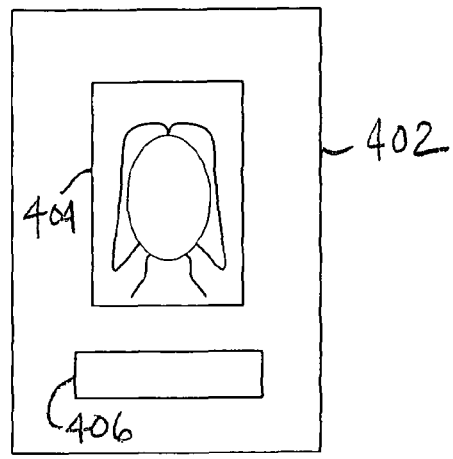
FIGS. 4A, 4B, and 4C show examples of user interfaces provided in some embodiments by sub-templates selected based on detected content type, in this example still image, video, and audio content, respectively.
Figure 4B:
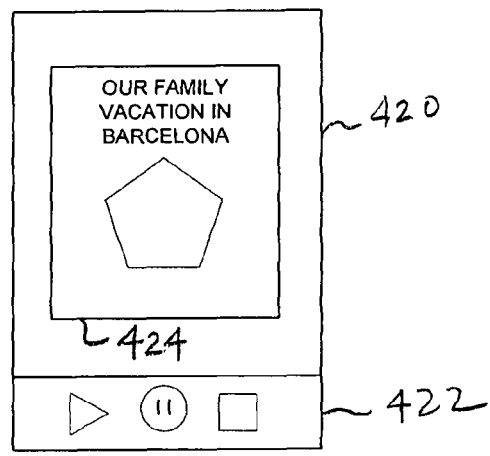
Figure 4C:
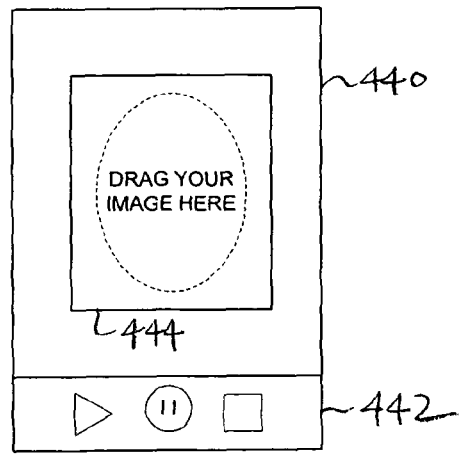

FIGS. 4A, 4B, and 4C show examples of user interfaces provided in some embodiments by sub-templates selected based on detected content type, in this example still image, video, and audio content, respectively. In the case of the example shown in FIG. 4A, a still image, such as a photo or other image file, has been dragged into image area 110 of FIG. 1 resulting in a still image sub-template being selected and associated with the webpage displayed in editing pane 102. The sub-template has caused an image item interface 402 to be displayed in image area 110. The sub-template displays the image 404 and provides in this example a caption text box 406 having placeholder text the user can replace with his/her own caption text.

As shown in FIG. 4B, associating a movie or other video item with image area 110 results in a video item interface 420 being displayed in image area 110 by a sub-template selected based on the content type. The interface shows a set of controls 422, in this example including play, pause, and stop controls, which will/would have in the published webpage the same appearance as shown in FIG. 4B and displayed to the user via editing pane 102 and which, when published, would have associated with them automatically the corresponding play, pause, and stop functionality. In various other embodiments, other/different controls are provided, including image/video-specific controls such as contrast, brightness, etc. In the example shown in FIG. 4B a still image 424 associated with and representative of the video content is displayed. In various embodiments, the still image is provided and/or selected by the user, derived automatically from the video content, e.g., from an initial frame or frames thereof, and/or received and/or identified by a video content authoring and/or editing application used to create, edit, or otherwise provide the video content, e.g., a video authoring application with which a web authoring application being used to create/edit the webpage is integrated and/or at least compatible.

FIG. 4C shows an audio item interface 440 provided by a sub-template selected based on a determination that an added content item comprises audio content. In this example, the interface 440 includes a set of controls 442 that has the same appearance and corresponding functionality as the set of controls 422 of FIG. 4B, i.e., play, pause, and stop; however, in some embodiments the associated sub-template is configured to generate code required to display the controls 442 and provide their respective associated functionality as appropriate for audio content of the type added to the web page, which code and/or functionality may be different than that generated for video content. In this example, an image area 444 is included and displays initially placeholder text prompting the user to drag/drop into the area an image the user desires to use to represent the audio content, if desired. In some embodiments, if no image is provided or selected prior to publication, a default icon, graphic, or image is included. In some embodiments, if no image is provided or selected by the user prior to publication the appearance of the object as published is modified to omit the image area 444.

Figure 5:
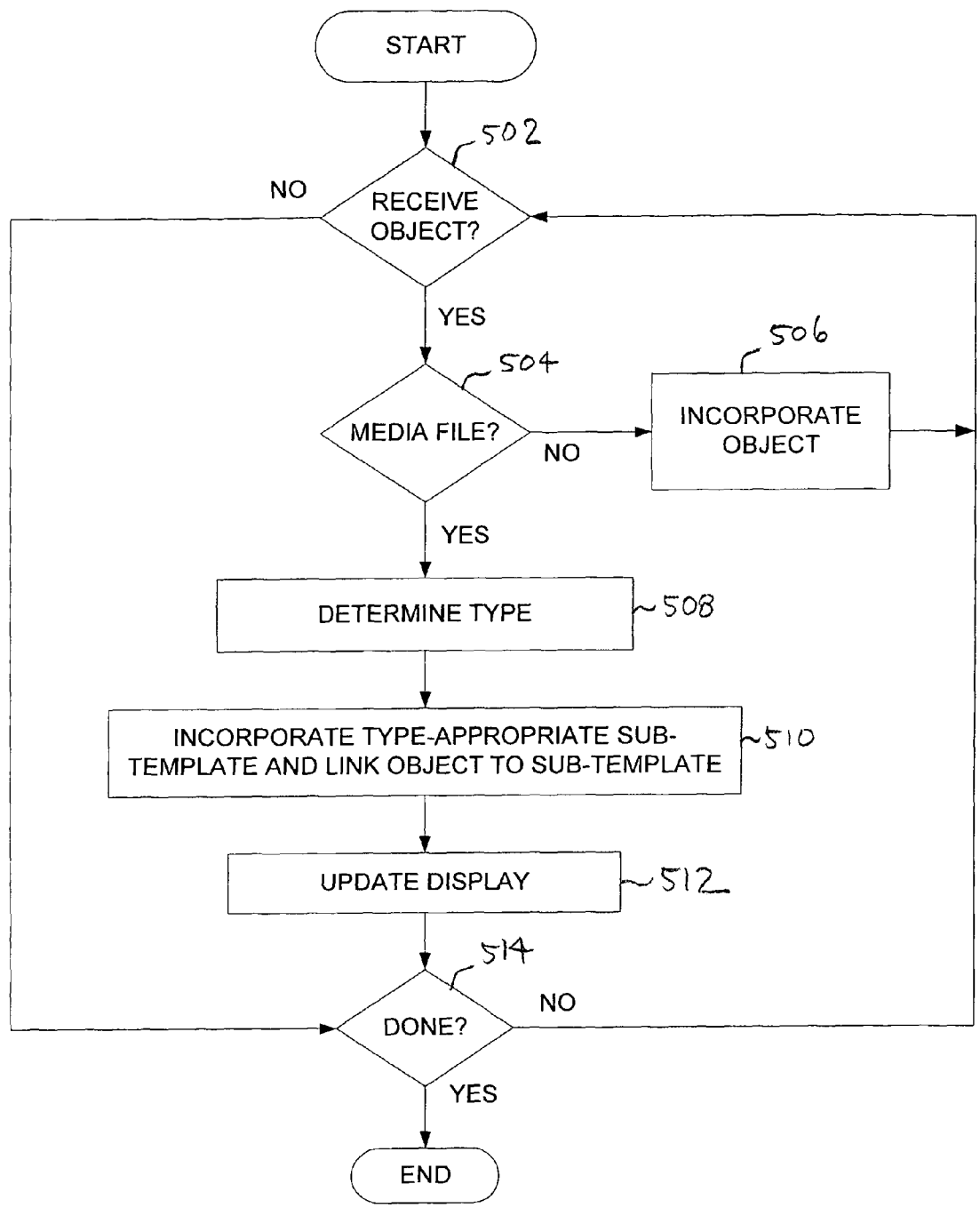
FIG. 5 is a flow chart illustrating an embodiment of a process for automatically selecting a sub-template based on content.

FIG. 5 is a flow chart illustrating an embodiment of a process for automatically selecting a sub-template based on content. In this example, a sub-template is selected automatically when a media file or object is added, however the same techniques may be applied in other embodiments and contexts to non-media content. In the example shown, when an object, if any, is received (502)—e.g., in the example shown in FIG. 1 if a file or other object is dragged into the editing pane 102—it is determined whether the object is a media file or object (504). If not, the object is incorporated into the webpage, e.g., by invoking functionality of a template on which the webpage is based. If a received object is determined to be a media file, the media/file type is determined (508); a type-appropriate sub-template is selected and associated with the webpage, and the media file or other object linked to the sub-template (510); and the user interface display (e.g., editing pane 102) is update to reflect the newly-added object (512), e.g., by displaying an appropriate one of the interfaces shown in FIGS. 4A-4C. In various embodiments, the media/file type is determined based at least in part on a file extension (e.g., .jpg, .mov, .mp3) or suffix of a filename and/or other name or identifier associated with the object; an application, system, and/or process with which the object is associated, such as one used to create, edit, or manage the object; file and/or object metadata; and/or a logical and/or physical storage location in which the object is stored, e.g., a file folder and/or path associated with a particular application and/or class of application and/or one used as a default by an operating system and/or file system to store objects of a particular type. In some embodiments, all objects of a particular general category (e.g., still image, video, audio) have the same sub-template associated with them. In other embodiments, one or more sub-templates may be specific to files of a particular type within a general category, e.g., .mov video files versus .avi video files. The process of FIG. 5 ends when an indication is received that the user is done editing the webpage or other document, file, or other body of content (514).

Figure 6:
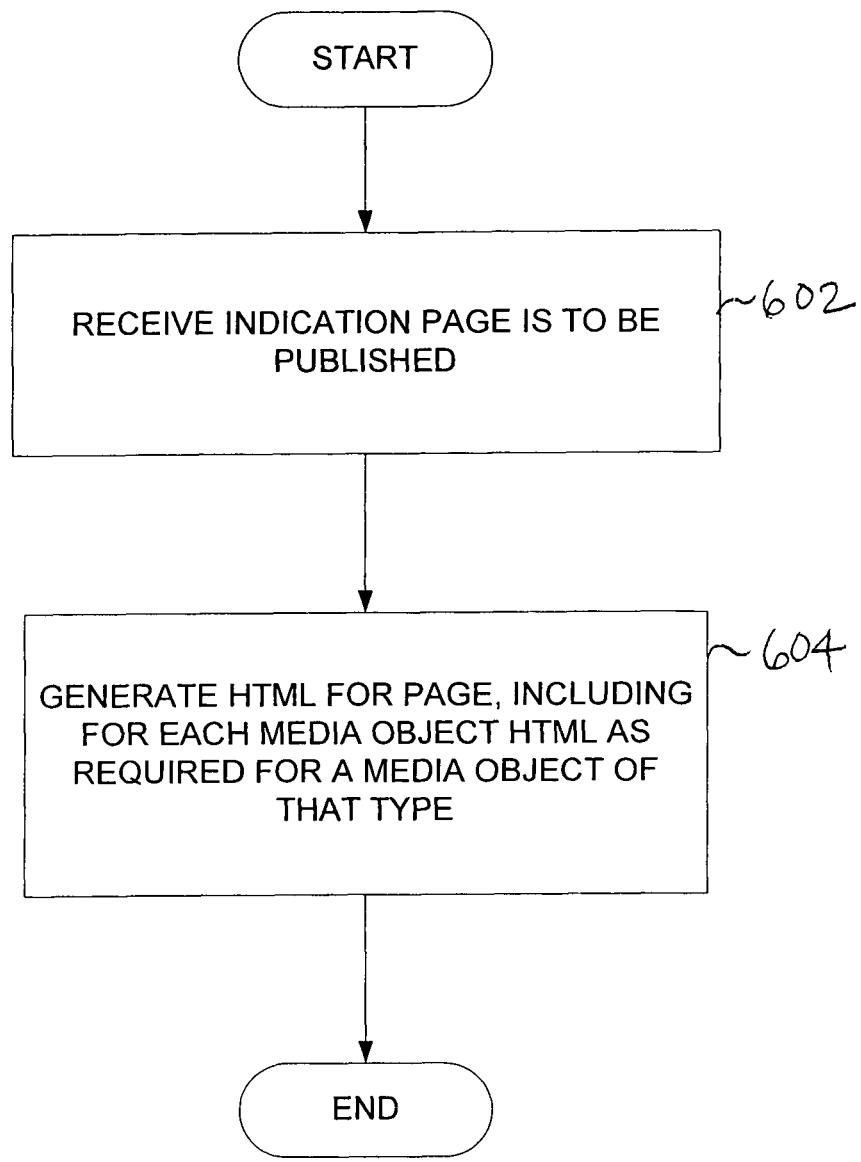
FIG. 6 is a flow chart illustrating an embodiment of a process for publishing a webpage into which a media or other content item has been incorporated.

FIG. 6 is a flow chart illustrating an embodiment of a process for publishing a webpage into which a media or other content item has been incorporated. In some embodiments, the process of FIG. 6 is included in 204 and/or 206 of FIG. 2. At 602, an indication is received that the webpage is to be published. An example of such an indication is user selection of the publish button 114 of FIG. 1. At 604, html and/or other code required to publish the webpage is generated, including for each media object html and/or other code required to represent on and/or otherwise make accessible via the webpage as published a media object of that particular type. Examples of content-appropriate and/or specific code generation and/or other processing performed at publish include scaling a still image to a size that is reasonable for display via the Web, e.g., to a 600 by 800 pixel size and re-rendering a movie or other video into a frame-by-frame format more suitable for publishing via the Web. In some embodiments, the media object type-specific code is generated at least in part by and/or based at least in part on data associated with a sub-template selected automatically based on the media content and/or type. In some embodiments, a webpage containing one or more media content items is stored in two formats: a native format that facilitates subsequent editing in a rich environment and as html and/or other code suitable for publishing to the Web.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for enabling a user to create or edit a webpage, comprising:
   providing, via a user interface for creating and editing a webpage, a template of the webpage that includes a placeholder item that is replaceable by content of a plurality of media types including text, image, audio, and video content;
   receiving from a user via the user interface an indication to replace the placeholder item by a selected content item;
   automatically selecting a sub-template from a plurality of available sub-templates based at least in part on a media type of the selected content item and linking the selected content item to the selected sub-template;
   integrating the selected content item in place of the placeholder item of the template using the selected sub-template;
   determining, based on the selected content item, whether to provide a media interface having media controls, wherein the media controls are configured to control presentation of the selected content item; and
   causing a representation of the selected content item that is appropriate for the media type of the selected content item to be provided in the user interface and on the webpage as published, wherein the representation of the selected content item includes the media interface if the media interface is to be provided.

2. A method as recited in claim 1, further comprising displaying via the user interface a representation of the webpage and including in the representation of the webpage a media type-appropriate object that represents the selected content item.

3. A method as recited in claim 1, wherein the representation of the selected content item is editable via the user interface.

4. A method as recited in claim 1, wherein the representation of the selected content item includes the selected content item, an image associated with the selected content item, one or more media type appropriate controls associated with the selected content item, or any combination thereof.

5. A method as recited in claim 1, wherein the representation of the selected content item in the user interface is the same as it appears in the webpage as published.

6. A method as recited in claim 1, further comprising using the selected sub-template to generate for the webpage code appropriate to the media type as required to include the selected content item in the webpage as published.

7. A method as recited in claim 1, wherein the selected content item comprises a media object, a still image, a photograph, a movie or other video file, an audio file, or any combination thereof.

8. A method as recited in claim 1, wherein the indication is received in response to the selected content item being dragged, pasted, or otherwise placed in the placeholder item of the template.

9. A method as recited in claim 1, further comprising storing in a first file having a first format a first data associated with the webpage, which first data includes data usable to edit the webpage via the user interface, and storing in a second file having a second format a second data associated with the webpage, which second data includes media type appropriate code for including the selected content item in the webpage as published.

10. A method as recited in claim 1, wherein the media type of the selected content item is determined based at least in part on one of more of the following: an extension or suffix of a filename or other name or identifier associated with the selected content item; an application, system, and/or process with which the selected content item is associated; metadata associated with the selected content item; and a logical and/or physical storage location in which the selected content item is stored.

11. A system for enabling a user to create or edit a webpage, comprising:
    a processor configured to:
      provide, via a user interface for creating and editing a webpage, a template of the webpage that includes a placeholder item that is replaceable by content of a plurality of media types including text, image, audio, and video content;
      receive from a user via the user interface an indication to replace the placeholder item by a selected content item;
      automatically select a sub-template from a plurality of available sub-templates based at least in part on a media type of the selected content item and link the selected content item to the selected sub-template;
      integrate the selected content item in place of the placeholder item of the template using the selected sub-template;
      determine, based on the selected content item, whether to provide a media interface having media controls, wherein the media controls are configured to control presentation of the selected content item;
      cause a representation of the selected content item that is appropriate for the media type of the selected content item to be provided in the user interface and on the webpage as published, wherein the representation of the selected content item includes the media interface if the media interface is to be provided; and
    a memory coupled to the processor and configured to provide the processor with instructions.

12. A system as recited in claim 11, further comprising a display coupled to the processor, wherein the memory is further configured to provide to the processor instructions for presenting via the display the user interface that includes a representation of the webpage and includes in the representation of the webpage a media type-appropriate object that represents the selected content item.

13. A computer program product for enabling a user to create or edit a webpage, the computer program product being embodied in a non-transitory computer readable storage medium and comprising computer instructions to:
  Provide, via a user interface for creating and editing a webpage, a template of the webpage that includes a placeholder item that is replaceable by content of a plurality of media types including text, image, audio, and video content;
  receive from a user via the user interface an indication to replace the placeholder item by a selected content item;
  automatically select a sub-template from a plurality of available sub-templates based at least in part on a media type of the selected content item and link the selected content item to the selected sub-template;
  integrate the selected content item in place of the placeholder item of the template using the selected sub-template;
  determine, based on the selected content item, whether to provide a media interface having media controls, wherein the media controls are configured to control presentation of the selected content item; and
  cause a representation of the selected content item that is appropriate for the media type of the selected content item to be provided in the user interface and on the webpage as published, wherein the representation of the selected content item includes the media interface if the media interface is to be provided.

14. A computer program product as recited in claim 13, further comprising computer instructions to display via the user interface a representation of the webpage and including in the representation of the webpage a media type-appropriate object that represents the selected content item.

15. A system as recited in claim 11, wherein the representation of the selected content item includes the selected content item, an image associated with the selected content item, one or more media type appropriate controls associated with the selected content item, or any combination thereof.

16. A system as recited in claim 11, wherein the processor is further configured to use the selected sub-template to generate the webpage code appropriate to the media type as required to include the selected content item in the webpage as published.

17. A system as recited in claim 11, wherein the indication is received in response to the selected content item being dragged, pasted, or otherwise placed in the placeholder item of the template.

18. A computer program product as recited in claim 13, wherein the representation of the selected content item includes the selected content item, an image associated with the selected content item, one or more media type appropriate controls associated with the selected content item, or any combination thereof.

19. A computer program product as recited in claim 13, wherein the indication is received in response to the selected content item being dragged, pasted, or otherwise placed in the placeholder item of the template.

20. A method as recited in claim 1, further comprising automatically determining the media type of the selected content item.

21. A computer program product as recited in claim 13, further comprising computer instructions to use the selected sub-template to generate for the webpage code appropriate to the media type as required to include the selected content item in the webpage as published.

* * * * *